United States Patent [19]
Turney

[11] 3,770,008
[45] Nov. 6, 1973

[54] RELIEF VALVE THAT SEALS AGAINST VACUUM

[75] Inventor: Larry R. Turney, Denton, Tex.

[73] Assignee: Victor Equipment Company, Denton, Tex.

[22] Filed: Dec. 11, 1972

[21] Appl. No.: 313,971

[52] U.S. Cl........ 137/516.25, 137/516.29, 137/540, 251/210
[51] Int. Cl. .......................................... F16k 17/06
[58] Field of Search ................... 137/247.17, 247.19, 137/512, 512.3, 516.25, 516.29, 522, 526, 540, 543.17, 543.19; 251/172, 210, 211

[56] References Cited
UNITED STATES PATENTS

| | | | |
|---|---|---|---|
| 2,217,056 | 10/1940 | Johnson .............................. | 137/526 |
| 2,557,536 | 6/1951 | Drane et al. ......................... | 137/526 |
| 2,809,659 | 10/1957 | Gillespie et al. ..................... | 137/526 |
| 3,058,486 | 10/1962 | McDermott et al. ........... | 137/516.29 |
| 3,216,451 | 11/1965 | Smallpiece ..................... | 137/516.25 |
| 3,272,218 | 9/1966 | Johnson .............................. | 137/540 |
| 3,347,266 | 10/1967 | Hansen .............................. | 137/540 |
| 3,487,852 | 1/1970 | Kikendall............................ | 137/540 |

Primary Examiner—William R. Cline
Assistant Examiner—George L. Walton
Attorney—Wm. T. Wofford et al.

[57] ABSTRACT

A relief valve that is reseatable to seal against high vacuum characterized by, in addition to the usual body and cap with conventional passageways, internal chamber, biasing means, and biasing adjustment means for effecting the relief valve action therewithin, a first resilient seat that is disposed circumferentially about a first passageway through the body and being designed to block flow in both directions when engaged by a seal surface; a first seat retainer removably holding the resilient seat in place and having a first annular seal surface; an upper seat reciprocally disposed within the internal chamber and having a seal surface at its lower end disposed adjacent the first resilient seat for sealing engagement therewith, the upper seat having a second annular seal surface disposed opposite the first annular seal surface; and a vacuum supplemental seal means for supplemental sealing against high vacuum. The vacuum supplemental seal means is disposed intermediate the first and second annular seal surfaces so as to sealingly engage them and block flow toward the first passageway when the upper seat has its seal surface sealingly engaging the first resilient seat. Thus, the relief valve can be employed as a safety release on a pressurized vessel, yet allow the vessel to be operated under high vacuum with a leak rate of only about $2 \times 10^{-10}$ cubic centimeters per second.

4 Claims, 3 Drawing Figures

PATENTED NOV 6 1973

3,770,008

RELIEF VALVE THAT SEALS AGAINST VACUUM

BACKGROUND OF THE INVENTION

1. Field of the Invention:

This invention relates to a new type of valve not heretofore available; namely, a pressure relief valve that also seals against high vacuum. More particularly, this invention pertains to a pressure relief valve that will reseat to hold high vacuum, even against the smallest, most mobile, most difficulty sealed gaseous molecules.

2. Description of the Prior Art:

Myriad valve structures have been known to the prior art. These valve structures have included relief valves, check valves, manually operable and automatically operable valves for sealing against a wide variety of conditions.

Insofar as I am aware, however, the prior art has not provided a combination relief valve that would reseat itself, even if actuated at the high pressure, to seal against high vacuum; particularly sealing against even small, mobile, difficultly sealed-against gaseous molecules like helium. Consequently, researchers employing pressurized vessels that had to be subsequently evacuated to remove the contaminants within the vessel have had to employ a plurality of valves, frequently using dense metal seats and the like to seal against the small molecules under high vacuum.

Accordingly, it is an object of this invention to provide a combination valve that will serve both as a pressure relief valve and has a high vacuum valve that seals against even small, mobile gaseous molecules, thereby obviating the disadvantages of the prior art structures.

It is also a specific object of this invention to provide improved structural embodiments that effect the foregoing object, yet provide a fool-proof valve that is easily assembled, economical and dependable.

These and other objects will become apparent from the descriptive matter hereinafter, particularly when taken in conjunction with the drawings.

DESCRIPTION OF PREFERRED EMBODIMENTS

Figure 1:
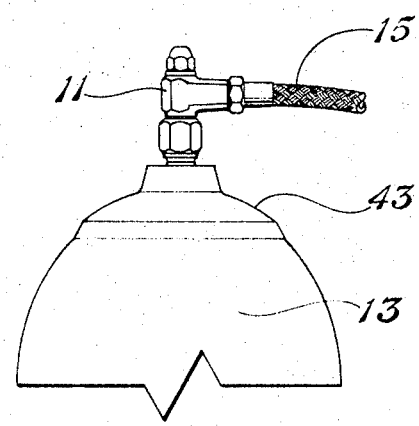
FIG. 1 illustrates a small pressure vessel with the relief valve of this invention, actually a combination valve, installed thereon.

Referring to FIG. 1, the relief valve 11 is connected into an upper portion of a pressure vessel 13. The relief valve 11 also is connected with conduit 15. The conduit 15 may lead to another vessel, or to an effluent element, such as a flare or hood, for safe venting of the fluids if the relief valve 11 is opened by high pressure. The relief valve 11 not only allows a release of fluid if the pressure in pressure vessel 13 becomes too high, but seals such that the pressure vessel 13 can be evacuated to remove contaminants therefrom; for example, before it is filled with another gas, as for carrying out a different reaction, or process step. Frequently, an inert gas such as helium will be employed in cleansing out vessels of other gaseous impurities by a process of alternate pressurization and evacuation. Thus, if conduit 15 is connected with another vessel undergoing such a purification, it is imperative that the relief valve 11 seal against even the small helium molecules when the pressure vessel 13 is evacuated to a high vacuum. It is imperative, for many scientific research projects that a leak rate of less than $1 \times 10^{-9}$ cubic centimeters per second be achieveable under high vacuum operation; as for investigating heat transfer coefficients at high vacuum. The relief valve 11 has been found to effect an unbelieveably low leak rate of only about $2 \times 10^{-10}$ cubic centimeters per second under high vacuum operation.

Figure 2:
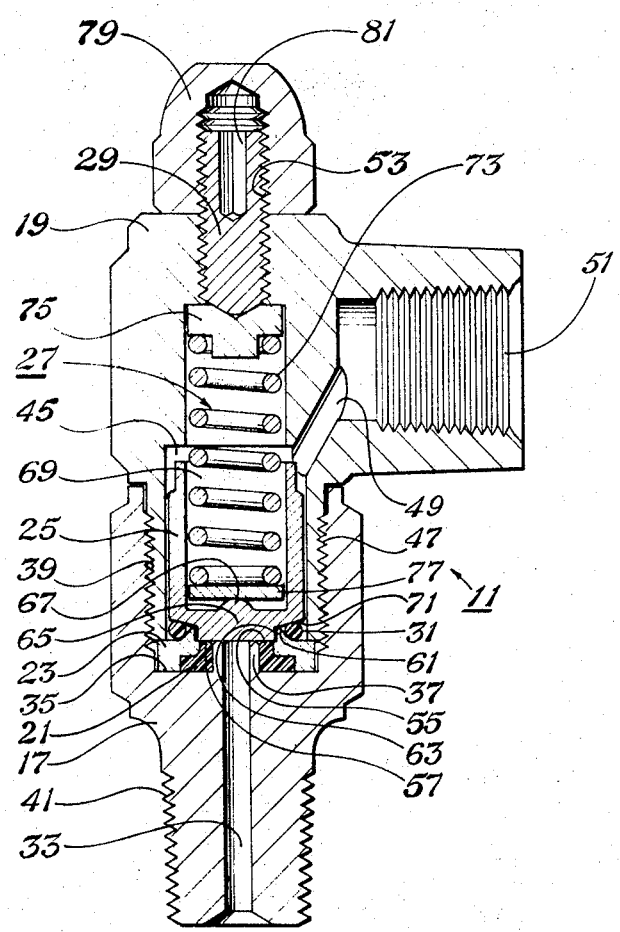
FIG. 2 is an assembled cross sectional view of the relief valve of FIG. 1.
Figure 3:
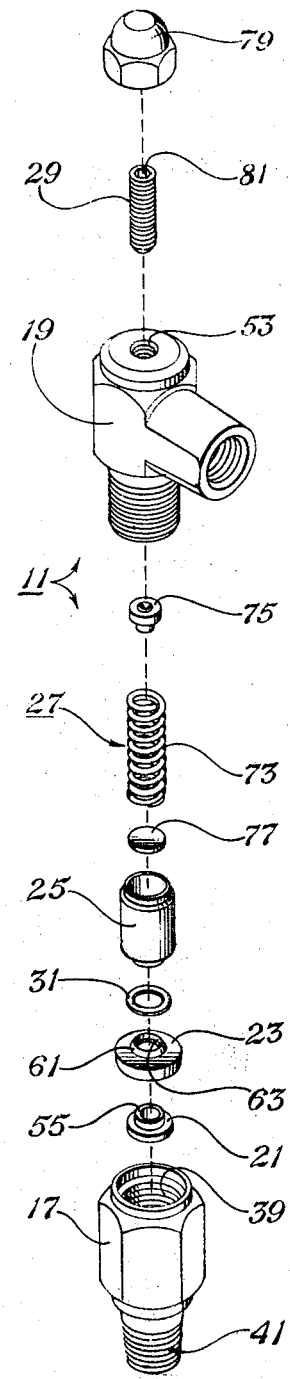
FIG. 3 is an exploded isometric view of the relief valve of FIGS. 1 and 2.

Referring to FIGS. 2 and 3, the relief valve 11 comprises the major elements and subassemblies of body 17, cap 19, first resilient seat 21, first seat retainer 23, upper seat 25, biasing means 27, biasing adjustment means 29 and vacuum supplemental seal means 31.

The body 17 has a first passageway 33, FIG. 2, extending longitudinally thereof. The body 17 defines the bottom 35 of an internal chamber. A concentric, centrally disposed lip 37 is provided at the interior end of the first passageway 33 and affords interior concentric support for the first resilient seat 21. The body 17 has an internal thread 39 for connection with the cap 19. If desired, O-rings may be employed in conjunction with the internal thread 39 to ensure sealing when a pressurized interconnection is employed; as when conduit 15, FIG. 1, connects with another pressurized vessel. Ordinarily, the O-ring seal is not necessary, since the conduit 15 is vented to the atmosphere. The body 17 has connection means, such as external threads 41, for being connected with a vessel that is capable of withstanding both the pressure and vacuum, illustrated by pressure vessel 13 in FIG. 1. Expressed otherwise, the relief valve 11 is sealingly screwed into a reinforced top 43 of pressure vessel 13.

The cap 19 sealingly engages the body 17 to define an internal chamber 45, FIG. 2. Specifically, the cap 19 has an external thread 47 that sealingly engages the internal thread 39 of body 17. As indicated hereinbefore, the degree of sealing is not ordinarily critical. The cap 19 has a second passageway 49 leading exteriorly thereof. As illustrated, the second passageway 49 leads into an internally threaded section 51 that may be employed for connection with a conduit, such as conduit 15, to vent any fluids released to a safe area. The internal chamber 45 is connected with the first passageway 33 at one end, near the bottom 35. The internal chamber 45 is connected with the second passageway 49 at a location spaced from the one end to allow interpositioning of a suitable seat and seal for controlling the flow of fluids. As illustrated, the cap 19 also has an internally threaded aperture 53 for receiving the biasing adjustment means 29.

The first resilient seat 21 is disposed circumferentially about the first passageway, as annularly about lip 37. The first resilient seat 21 has a coefficient of elasticity, has a modulus of compressibility and is designed so as to block flow of fluids in both directions when engaged by a seal surface. Specifically, the first resilient seat 21 comprises a Teflon ring that has rounded top shoulders 55. The Teflon has the requisite modulus of compressibility and coeffeicient of elasticity; and the rounded annularly disposed, top shoulders 55 serve to block fluid flow in both directions when engaged by a flat seal surface, such as seal surface 57 on the upper seat 25. The top shoulders 55 protrude interiorly of the internal chamber 45 beyond the lip 37. When the seal surface 57 exerts pressure on the top shoulders 55, there is sealing engagement. The force with which the top shoulders 55 resist further downward movement of the seal surface 57 is increased by the support given by interiorly disposed lip 37 and the exteriorly disposed first seat retainer 23. Other materials, such as nylon, can be employed for the resilient seat 21 instead of Teflon. It should be emphasized, however, that the material of which the first resilient seat is made must have elasticity sufficient to rebound after prolonged closure, must have sufficient rigidity to sealingly engage the seal surface 57 with a force great enough to retain pressure within the vessel 13, and must be inert to the fluids that would be employed in the vessel 13 so as to resist deterioration.

The first seat retainer 23 is disposed circumferentially of the first resilient seat 21. The first seat retainer 23 is rigid so as to provide the requisite strength in back-up of the first resilient seat 21; and, also, to provide a seal surface for forming a second, or supplementary, seal. Ordinarily, the first seat retainer 23 will be formed of metal, such as the copper alloys or stainless steels. The first seat retainer 23 is removably retained in the body 17. As illustrated, its top engages the bottom of the internal threaded section of the cap 19 so as to hold the first resilient seat 21 in place when the cap 19 is screwed into the body 17. As illustrated, also, the first seat retainer 23 has a first annular seal surface 61. The first annular seal surface 61 is in the form of a frusto-conical section that has a surface that is sufficiently smooth to effect sealing when engaged by the vacuum supplemental seal means 31. The first seat retainer 23 has a centrally disposed aperture 63 that allows the seal surface 57 on the bottom of upper seat 25 to come in contact with the top shoulders 55.

The upper seat 25 is reciprocally disposed within the internal chamber 45. Expressed otherwise, the upper seat 25 is movable longitudinally and reciprocally within the chamber 45, although it has only slightly smaller outside dimensions than the chamber 45 has inside dimensions. As indicated hereinbefore, the upper seat 25 has seal surface 57 at its end disposed adjacent the first resilient seat 21 for sealing engagement therewith, normally its lower end when installed in an upright position. As illustrated, the seal surface 57 is disposed at the bottom end of a central protrusion 65 that fits within the centrally disposed aperture 63 of the first seat retainer 23. The upper seat 25 has a pivot fulcrum 67 that protrudes interiorly within a cavity 69. The cavity 69 and the protrusion 67 will be described in more detail with respect to the biasing means 27 hereinafter. The upper seat 25 has a second annular seal surface 71 that is disposed opposite and closely adjacent the first annular seal surface 61 for sealing engagement with the vacuum supplemental seal means 31 when the upper seat is in its closed position. The closed position is defined by sealing engagement of the seal surface 57 with the top shoulder 55 of the first resilient seat 21. Specifically, the annular seal surface 71 is an inverted frusto-conical section.

The biasing means 27 is provided for biasing the upper seat 25 toward its closed position. As illustrated, the biasing means 27 comprises spring 73, pressure plate 75 and rocking plate 77, all disposed within the internal chamber 45. The bottom of the spring 73 and the rocking plate 77 are disposed interiorly of the cavity 69 within the upper seat 25. The pivot fulcrum 67 and the rocking plate 77 accommodate imperfections in the spring 73 and allows the use of economical imperfect springs as the biasing means 27.

The biasing adjusting means 29 comprises an adjustment screw within the internally threaded aperture 53. A cap nut 79 is provided to cover the allen head socket 81 in the adjustment screw and to lock the adjustment screw at a setting. The cap nut 79 may be removed and an allen head wrench inserted in the allen head socket 81 to increase the compressive force and consequently increase the pressure at which the relief valve will vent fluids from the pressure vessel 13. Conversely, screwing the biasing adjustment means 29 in the opposite direction will decrease the compression on spring 73 and decrease the pressure at which the relief valve 11 will vent fluid. The cap nut is reinstalled to lock in the new setting.

The vacuum supplemental seal means 31 is provided for additional and more nearly perfect sealing against high vacuum. The vacuum supplemental seal means 31 is disposed intermediate the first and second annular seal surfaces 61 and 71 so as to sealingly engage them and block the flow of fluids toward the first passageway 33 when the upper seat 25 has its seal surface 57 sealingly engaging the first resilient seat 21. As illustrated, the vacuum supplemental seal means 31 is an O-ring that sealingly engages the respective frusto-conical annular seal surfaces 61 and 71 with progressively greater force under progressively greater vacuum differential pressure.

In operation, the relief valve 11 is screwed into the pressure vessel 13 and the biasing adjustment means 29 screwed down to attain the desired compression on the biasing means 27 to control the pressure against which the relief valve 11 will relieve pressure. Assume that pressure is reached, the pressure against the protrusion 65 will force the upper seat 25 upwardly allowing fluid to flow intermediate the seal surface 57 and the top shoulders 55. The fluid will also flow intermediate the vacuum supplemental seal means 31 and its respective opposed annular seal surfaces 61 and 71 and out the second passageway 49. When pressure is relieved, the valve will reseat under the force of the spring 73, again sealingly engaging the seal surface 57 with the top shoulders 55. Thereafter, a vacuum may be drawn on pressure vessel 13, as for cleansing of the gas that previously occupied its interior. Initially, the first resilient seat 21 forms an adequate seal with the seal surface 57. As is well known in the art, however, the problem of sealing against high vacuum is inexplicably difficult. Consequently, as higher vaccums are attained, there will be, ordinarily, a propensity for a valve seal to leak. In the event there is leakage intermediate the top shoulder 55 and the seal surface 57, the vacuum supplemental seal means 31 is drawn into sealing engagement with its respective and oppositely disposed annular seal surfaces 61 and 71 to seal thereagainst with an increasingly greater force as the vacuum becomes increasingly greater. In this way, the surprisingly low leak rate is attainable under vacuum.

From the foregoing, it can be seen that this invention attains the objects delineated hereinbefore, provides a surprising relief valve that serves as a combination relief valve and vacuum-proof valve to seal against high pressure within a pressure vessel or against high vacuum within the pressure vessel. In fact, the relief valve 11 has enabled attaining an unbelieveable low leak rate of $2 \times 10^{-10}$ cubic centimeters per second. This leak rate is much less than the $1 \times 10^{-9}$ cubic centimeters per second needed and heretofore thought unattainable in a single valve that also serves as a pressure relief valve.

Although this invention has been described with a certain degree of particularlity, it is understood that the present disclosure has been made only by way of example and that numerous changes in the details of construction and the combination and arrangement of parts may be resorted to without departing from the spirit and the scope of this invention.

What is claimed is:

1. A relief valve that is reseatable to seal against vacuum comprising:
   a. a body having a longitudinally extending first passageway and having a connection means for being connected with a vessel that is capable of withstanding both pressure and vacuum;
   b. a cap sealingly engaging said body to define an internal chamber therewithin and having a second passageway extending exteriorly thereof; said internal chamber being in connection with said first passageway at one end and with said second passageway at a location spaced from said one end;
   c. first resilient seat disposed circumferentially about said first passageway; said first resilient seat having a coefficient of elasticity and a compressive strength sufficient to, and being adapted so as to, block fluid flow in both directions when engaged by a seal surface;
   d. a first seat retainer disposed circumferentially of said first resilient seat and having a first annular seal surface; said first seat retainer being removably retained in said internal chamber;
   e. upper seat reciprocally disposed within said internal chamber; said upper seat having a seal surface at its one end disposed adjacent said first resilient seat for sealing engagement therewith; said upper seat having a second annular seal surface disposed opposite said first annular seal surface;
   f. biasing means for biasing said seal surface of said upper seat toward said first resilient seat;
   g. biasing adjustment means for adjusting the force with which said upper seat is biased toward said first resilient seat; and
   h. vacuum supplemental seal means for supplemental sealing against high vacuum; said vacuum supplemental seal means being disposed intermediate said first and second annular seal surfaces so as to sealingly engage same and block flow toward said first passageway when said upper seat has its seal surface sealingly engaging said first resilient seat such that said relief valve can be employed as a safety release against high pressure within said vessel and still have a leak rate less than $1 \times 10^{-9}$ cubic centimeters per second under high vacuum following pressurized operation.

2. The relief valve of claim 1 wherein said first resilient seat comprises a Teflon ring that has a top cross sectional shape that is arcuate at its top shoulder for engaging a flat seal surface and wherein said seal surface on said upper seat is flat.

3. The relief valve of claim 1 wherein said first and second annular seal surfaces comprise smooth, opposed frusto-conical and inverted frusto-conical surfaces; and said vacuum supplemental seal means comprises an O-ring that sealingly engages respective said frusto-conical seal surfaces with progressively greater force under progressively greater vacuum differential pressure such that a leak rate of about $2 \times 10^{-10}$ cubic centimeters per second is attainable even at near perfect vacuum.

4. The relief valve of claim 1 wherein said biasing means is an economical spring and said upper seat contains a centrally disposed pivot fulcrum at its one end; and a rocking plate is disposed intermediate said pivot fulcrum and the end of said spring such that an economical and imperfect spring can be employed; and said biasing adjusting means comprises an adjustable screw for increasing and decreasing the compressive force on said spring.

* * * * *